(12) United States Patent
Smith, III

(10) Patent No.: US 7,111,874 B2
(45) Date of Patent: *Sep. 26, 2006

(54) FLOATING SEAL FOR UNDERSEA HYDRAULIC COUPLING

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/158,140

(22) Filed: Jun. 21, 2005

(65) Prior Publication Data

US 2005/0230969 A1   Oct. 20, 2005

Related U.S. Application Data

(63) Continuation of application No. 10/661,896, filed on Sep. 12, 2003, now Pat. No. 6,923,476.

(51) Int. Cl.
*F16L 17/00* (2006.01)
(52) U.S. Cl. ...................... 285/108; 285/331; 277/602
(58) Field of Classification Search ................ 285/110, 285/108, 111, 917, 918; 251/149.7, 149.6
See application file for complete search history.

(56) References Cited

U.S. PATENT DOCUMENTS 6,202,690 B1 *   3/2001   Smith, III .............. 137/614.04

* cited by examiner

*Primary Examiner*—Aaron Dunwoody
(74) *Attorney, Agent, or Firm*—Wong, Cabello, Lutsch, Rutherford & Brucculeri, LLP

(57) ABSTRACT

A floating seal for an undersea hydraulic coupling member is moveable radially to seal with the male coupling member even if there is some misalignment with the female coupling member. The floating seal is restricted from axial movement within the female coupling member receiving chamber. The floating seal may seal with the female coupling member.

15 Claims, 2 Drawing Sheets

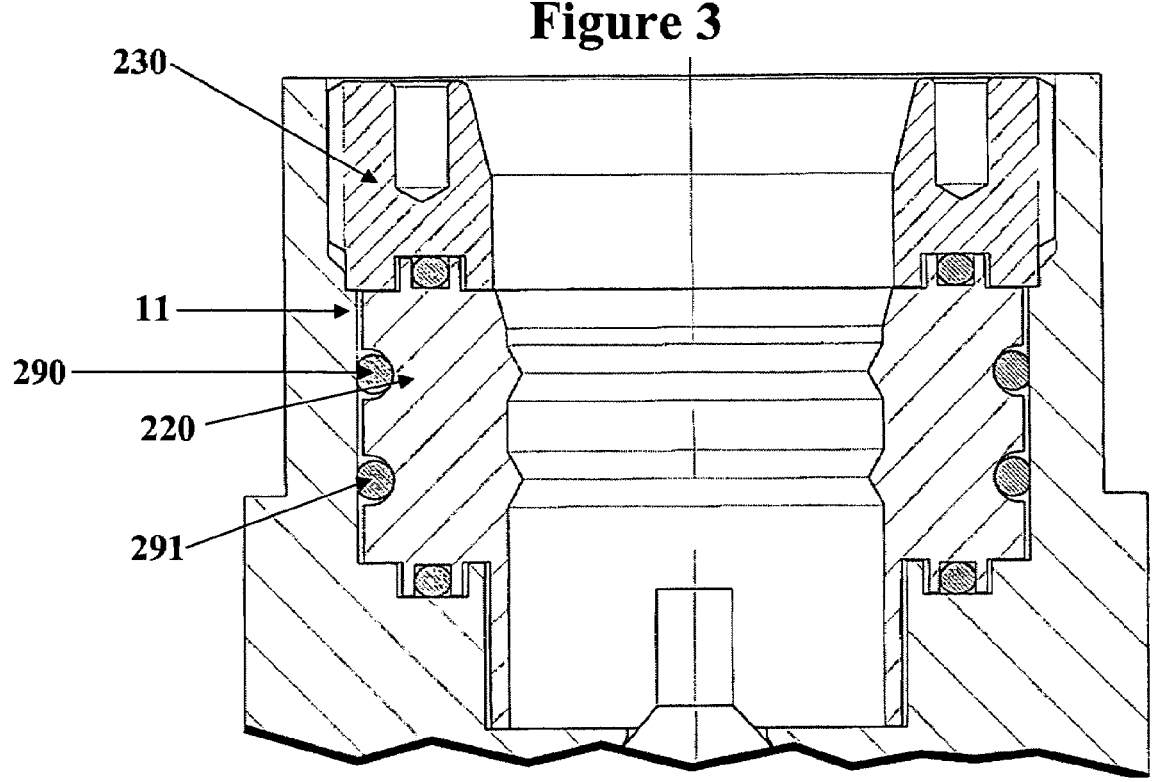

FLOATING SEAL FOR UNDERSEA HYDRAULIC COUPLING

CROSS-REFERENCE TO RELATED APPLICATION:

This application is a continuation of application Ser. No. 10/661,896 filed Sep. 12, 2003 (now U.S. Pat. No. 6,923,476 B2).

BACKGROUND OF THE INVENTION

1. Field of the Invention

This invention relates, in general, to hydraulic couplings, and specifically to hydraulic couplings used in undersea drilling and production applications. More particularly, the invention involves seals between male and the female coupling members in undersea hydraulic couplings.

2. Discussion of Prior Art

Subsea hydraulic couplings are old in the art. The couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section insertable into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

Optionally, a check valve may be installed in the female member and also in the male member. Each check valve is open when the coupling is made up; however, each check valve closes when the coupling is broken so as to prevent fluid from leaking out of the system of which the coupling is part.

Undersea hydraulic couplings may be connected or disconnected several times during their usage. For example, two or more undersea hydraulic coupling members may be attached to manifold plates or other structures that may be brought together using a remote operating vehicle. There may be some radial misalignment of the male and female coupling members during their assembly or connection. In some cases, the male coupling members may be securely attached to a manifold plate at a fixed subsea location, and the female coupling members then may be positioned onto the male coupling members. Because of misalignment between the male and female coupling members, the seals which may be held in the receiving chamber of the female coupling members may not completely engage all of the sealing surfaces of the male coupling members. Significant misalignment of the coupling members, and/or incomplete engagement of sealing surfaces, may cause or contribute to leakage of seawater into the couplings or loss of hydraulic fluid from the couplings.

U.S. Pat. No. 4,709,726 entitled Hydraulic Coupler With Floating Metal Seal relates to a floating retainer ring housed within the female coupling body. The floating retainer ring is metal or metallic.

An undersea hydraulic coupling with a floating seal is needed that will protect the surfaces of the coupling members from galling or other damage due to radial misalignment of the coupling members. Such a floating seal for an undersea hydraulic coupling is needed that will provide a seal with the female member and the male member during operation when there is possibility of radial movement inside the coupling. A reliable floating seal is needed between the male and female coupling members to withstand the high temperatures and high pressures in the subsea environment.

SUMMARY OF THE INVENTION

A floating seal for an undersea hydraulic coupling allows for radial misalignment of the male and female coupling members, and protects the sealing surfaces from galling or other damages during assembly or disassembly. The floating seal may be held in the female coupling receiving chamber using a seal retainer or nut secured to the female coupling member. The floating seal has one or more seals extending radially inwardly to engage the male coupling member, and one or more seals that engage the receiving chamber.

BRIEF DESCRIPTION OF THE DRAWINGS

The following drawings form part of the present specification and are included to further demonstrate certain aspects of the present invention. The invention may be better understood by reference-to one or more of these drawings in combination with the detailed description of specific embodiments presented herein.

FIG. 3 is a section view of a floating seal in a female coupling member of an undersea hydraulic coupling according to a third embodiment.

DETAILED DESCRIPTION OF THE PREFERRED EMBODIMENT

Figure 1:
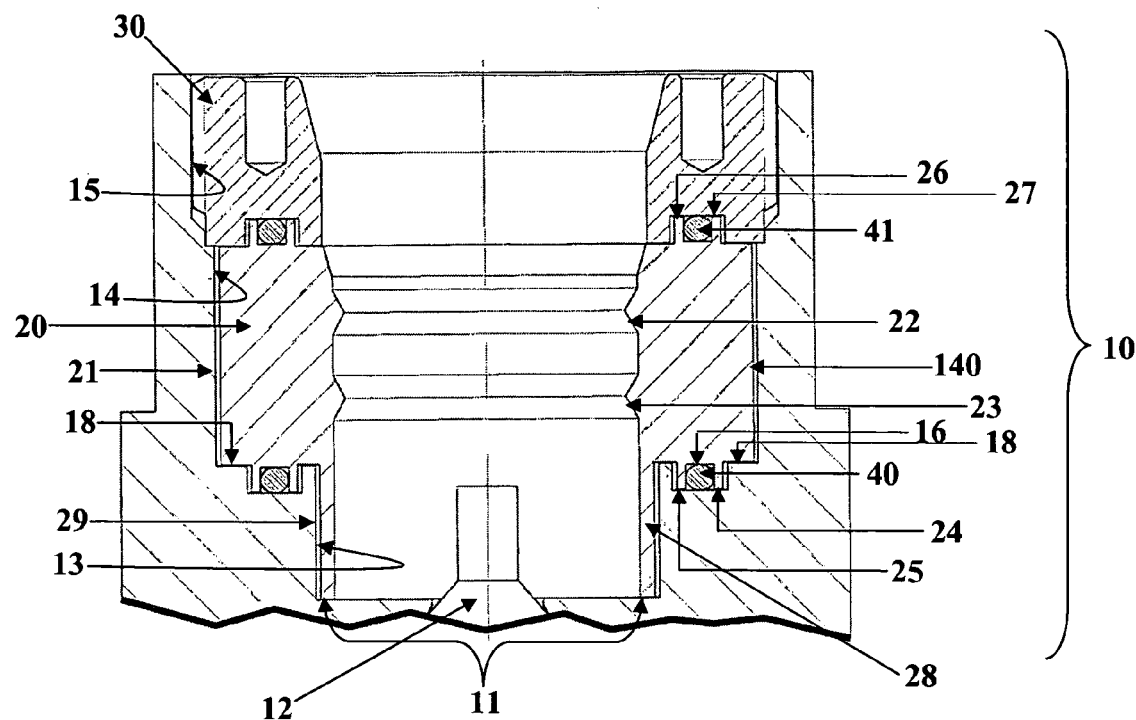
FIG. 1 is a section view of a floating seal in a female coupling member of an undersea hydraulic coupling according to a first embodiment.

As shown in FIG. 1, in a first embodiment, female coupling member 10 has a receiving chamber 11, which contains floating seal 20, into which a male coupling member (not shown) may be inserted and connected to provide flow of hydraulic fluid, receiving chamber. Poppet valve 12 in the female coupling member may be in a normally closed and sealed position until it is urged open by contact with a mating poppet valve in the male coupling member. The receiving chamber of the female coupling member may have a uniform internal diameter or may have several variations in its internal diameter. For example, the receiving chamber may have a first or smallest diameter 13, a second or intermediate diameter 14, and a third or largest diameter 15. Between each of the internal diameters is a shoulder. Shoulder 18 is between the first and the second diameters. The third diameter may be internally threaded.

Floating seal 20 may be inserted into the receiving chamber 11 of the female coupling member. The floating seal may have a uniform outer diameter or a stepped outer diameter, each portion of the floating seal having a smaller external diameter than the internal diameter of the receiving chamber at a given axial position. For example, the floating seal may be approximately 0.020 inches smaller in diameter than the receiving chamber, measured at an axial position. As shown in FIG. 1, the floating seal 20 may have a first or smallest outer diameter 29, and a second or largest outer diameter 21. The floating seal may include a bore liner portion 28 which may protect the female coupling member from galling or other damage from misaligned metal surfaces, however the bore liner extension is not necessary.

Projecting inwardly from the internal diameter of the floating seal are surfaces 22 and 23 which are dimensioned to engage and seal with the cylindrical outer surface of a male coupling member (not shown). The floating seal 20 may be an elastomeric material such as polyetheretherketone (PEEK), or other materials that are sufficiently resilient and compressible to form a fluid tight seal with the male coupling member. Preferably, the inner diameter of surfaces 22 and 23 may be slightly less than the outer diameter of the male coupling member.

The floating seal may be inserted into the receiving chamber and may be tightened or held in place by retainer nut 30. The retainer nut restricts axial movement of the floating seal 20 by holding the seal against shoulder 18. Optionally, the floating seal may be slightly compressed between the retainer nut and shoulder 18.

The floating seal also may include axial extending ridges 24 and 25 adjacent a first end thereof. O-ring 40 or a similar axially engageable seal may be positioned in groove 16 between axial extending ridges 24 and 25. The axial extending ridges 24 and 25 and the O-ring 40 insert into a pocket created in the receiving chamber 11 so that the ridge 24 and 25 seat on the bottom of the pocket and form seals between the floating seal and the receiving chamber. There may be some axial compression of the axial extending ridges, the amount of axial compression limited by contact between the floating seal shoulder and shoulder 18 of the female coupling member. Axial extending ridges 26 and 27 may extend from the floating seal adjacent a second end thereof. O-ring 41 or a similar axially engageable seal may be positioned in the groove between axial extending ridges 26 and 27 to provide a seal that axially engages the base of a pocket in the receiving chamber.

The retainer nut may be threaded to the female coupling member to secure and restrict axial movement of the floating seal. However, the floating seal may shift or move radially sufficiently to align and seal with the male coupling member even if there is some misalignment with the female coupling member. Additionally, during operation of the coupling, if there is radial movement the seals created at shoulder 18, in the base of the pockets against the axial extending ridges, and with O-rings 40 and 41 will be maintained to prevent leakage. It will be noted that 140 shows a radial space that remains between the floating seal 20 and the female coupling even after the floating seal is fully engaged. The floating seal of the present invention maintains its seals even if the floating seal 20 moves radially in space 140.

Figure 2:
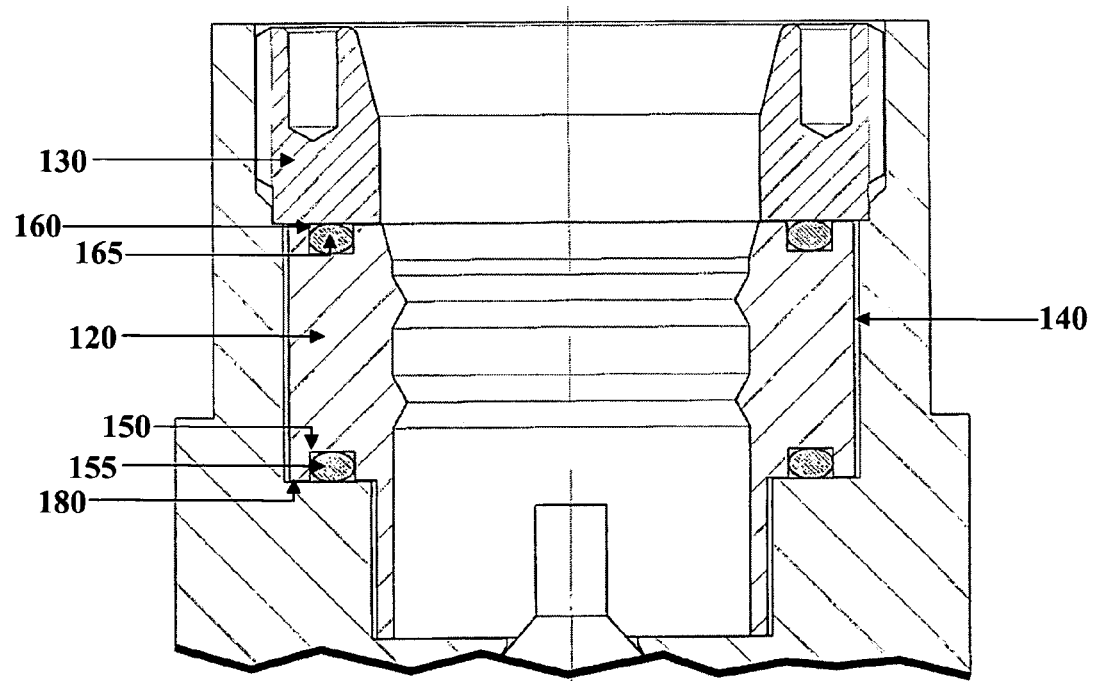
FIG. 2 is a section view of a floating seal in a female coupling member of an undersea hydraulic coupling according to a second embodiment.

FIG. 2 shows a second embodiment of the invention (all parts are the same as FIG. 1 unless specifically noted) in which floating seal 120 has a circumferential groove 150 adjacent a first end thereof and O-ring 155 positioned in the groove. O-ring 155 may engage the female coupling member at shoulder 180. Additionally, the floating seal 120 engages to form seals at shoulder 180 when the retainer 130 is tightened down. Circumferential groove 160 may be in the second end of the floating seal, and O-ring 165 is positioned therein to engage and seal with retainer nut 130.

As will be seen from FIG. 2, radial space 140 remains between the floating seal and the female coupling. The seals described above are maintained even when the floating seal moves radially within the female coupling.

FIG. 3 shows a third embodiment of the invention which adds additional seals to those shown in the embodiment of FIG. 1 (all parts are the same as those described with respect to FIG. 1, unless specifically noted otherwise). In this embodiment, floating seal 220 has O-rings 290 and 291 positioned around the outer circumference of the floating seal to engage the receiving chamber 11. Retainer nut 230 secures the floating seal from axial movement.

The floating seal is restricted from axial movement, and one or more seals engage the female coupling member and retainer. One or more seals also extend radially inwardly from the floating seal to engage the male coupling member. These seals may provide fluid tight engagement even if there is some radial misalignment or movement of the male coupling member with respect to the female coupling member.

Although variations in the embodiment of the present invention may not each realize all the advantages of the invention, certain features may become more important than others in various applications of the device. The invention, accordingly, should be understood to be limited only by the scope of the appended claims.

I claim:

1. A female undersea hydraulic coupling member, comprising:
    a floating seal inserted into a receiving chamber of the female coupling member, the floating seal having a smaller outer diameter than the receiving chamber and being movable radially as a whole within the receiving chamber, the floating seal having at least one axially engageable seal positioned adjacent a first end thereof and at least one axially engageable seal positioned adjacent a second end thereof, and at least one sealing surface extending radially inwardly from the floating seal.

2. The female undersea hydraulic coupling member of claim 1 wherein the axially engageable seals are O-rings.

3. The female undersea hydraulic coupling member of claim 1 further comprising a retainer nut threaded to the female coupling member, for preventing axial movement of the floating seal.

4. The female undersea hydraulic coupling member of claim 1 wherein the floating seal has a stepped outer diameter.

5. A floating seal for an undersea hydraulic coupling member comprising:
    a generally cylindrical elastomeric body having a first smaller outer diameter and a second larger outer diameter, a shoulder between the first and second outer diameters, an inner diameter having at least one sealing surface projecting inwardly therefrom, a first O-ring positioned in a groove in a first end of the floating seal, and a second O-ring positioned in a groove in the shoulder of the floating seal.

6. The floating seal of claim 5 further comprising a pair of axially extending ridges on the first end thereof.

7. The floating seal of claim 5 further comprising a pair of axially extending ridges on the shoulder thereof.

8. The floating seal of claim 5 further comprising at least one O-ring extending around the outer diameter thereof.

9. The floating seal of claim 5 further comprising a retainer nut dimensioned to abut the second end of the floating seal.

10. An undersea hydraulic coupling member comprising:
    a female coupling member having an internal bore and a receiving chamber with a shoulder intermediate the receiving chamber;

a floating seal dimensioned for insertion into the receiving chamber and positioned against the shoulder, the floating seal moveable radially as a whole within the receiving chamber; and a retainer nut engageable with the female coupling member, the retainer nut configured to hold and restrict axial movement of the floating seal between the retainer nut and the shoulder.

11. The undersea hydraulic coupling member of claim 10 wherein the floating seal has a first end and an O-ring positioned in a groove adjacent the first end thereof.

12. The undersea hydraulic coupling member of claim 11 wherein the floating seal has a second end and an O-ring positioned in a groove adjacent the second end thereof.

13. The undersea hydraulic coupling member of claim 10 further comprising a ridge extending axially from the floating seal.

14. The undersea hydraulic coupling member of claim 10 wherein the floating seal is axially compressed between the retainer nut and shoulder.

15. The undersea hydraulic coupling member of claim 10 wherein the floating seal has at least one sealing surface extending radially inwardly therefrom.

* * * * *